(12) United States Patent
Tomita et al.

(10) Patent No.: US 7,117,228 B2
(45) Date of Patent: Oct. 3, 2006

(54) METHOD FOR TRANSFORMING DATA FORMATS BETWEEN DIFFERENT DATABASE SYSTEMS, AN APPARATUS FOR EXECUTING THE METHOD AND THE PROGRAM OF THE METHOD

(75) Inventors: Aki Tomita, Tachikawa (JP); Kiyohiro Obara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 09/810,548

(22) Filed: Mar. 19, 2001

(65) Prior Publication Data

US 2002/0059307 A1    May 16, 2002

(30) Foreign Application Priority Data

Nov. 1, 2000    (JP) .............................. 2000-334349

(51) Int. Cl.
*G06F 17/30* (2006.01)
(52) U.S. Cl. .................... 707/200; 707/101; 707/104.1
(58) Field of Classification Search ................ 707/10, 707/101, 104.1, 1, 200
See application file for complete search history.

(56) References Cited

U.S. PATENT DOCUMENTS

| 6,125,304 | A  | * | 9/2000  | Suzuki ....................... 700/182 |
| 6,334,126 | B1 | * | 12/2001 | Nagatomo et al. ............. 707/4 |
| 6,408,299 | B1 | * | 6/2002  | Weerawarana et al. ..... 707/101 |
| 6,519,598 | B1 | * | 2/2003  | Nishizawa et al. ........... 707/10 |
| 6,636,808 | B1 | * | 10/2003 | Brown et al. .................. 702/3 |

* cited by examiner

*Primary Examiner*—Apu Mofiz
*Assistant Examiner*—Haythim Alaubaidi
(74) *Attorney, Agent, or Firm*—Mattingly, Stanger, Malur & Brundidge P.C.

(57) ABSTRACT

A data transforming method and apparatus of a database management system for transforming data within a disk storage device between database data formats, thereby reducing the system load, when converting data formats between database management systems. The invention includes a skeleton program for instructing data transformation and a communication program being provided on a host computer, and a data transformation program for transforming data formats and a communication program being provided on a disk storage. A request sent from the skeleton program via the communication programs to the data transformation program, causes the data format transformation to occur within the disk storage.

15 Claims, 11 Drawing Sheets

METHOD FOR TRANSFORMING DATA FORMATS BETWEEN DIFFERENT DATABASE SYSTEMS, AN APPARATUS FOR EXECUTING THE METHOD AND THE PROGRAM OF THE METHOD

BACKGROUND OF THE INVENTION

1. Field of the Invention

The present invention relates to a method for transforming data formats between different database management systems and an apparatus for executing the method, and more particularly to a method for transforming data formats between different database management systems, which needs no data transfer between a host computer and a disk storage device to reduce the system load when transforming a large scale database, and an apparatus for achieving the method.

2. Description of the Related Art

In the decade of 1990, data intensive applications have been emerged, such as data mining, data warehouse, and decision support system, which may process large amount of data. In such a situation, the amount of data doubles year by year, solutions adapted for efficiently managing data have been demanded. SAN (Storage Area Network) is one of solutions proposed in the second semester of 1998.

SAN is a network dedicated for data transfer, composed of storages and computers that access the storages. For example, data backup was done by using a LAN connecting other computers. When using SAN, the network dedicated for data transfer, the load traffic on the LAN can be reduced. The reduction of load on the LAN is one of major purposes of SAN. SAN may also be characterized by easy data sharing. This is because computers connected to SAN have physically access to any magnetic disk drives connected thereto.

However, when two computers can physically access to one same magnetic disk drive, it does not necessarily mean that the data can be shared at the application level. Data that is managed by a database management system (DBMS herein below) or a file system on one of those computers may be accessed by another computer, however another computer may have no means to interpret it. For this reason a variety of converter softwares have been developed for achieving data sharing between a file system and a DBMS or between different DBMS.

Data mining is often discussed as a method of effective exploitation of huge amount of data and tools for data mining are actively developed. In general, data mining tools may use data (for example, consumers' data) stored by OLTP (Online Transaction Program). An OLTP usually runs on a mainframe, and uses a DBMS for managing data. A data-mining tool, on the other hand, runs on an open system such as Unix or Windows NT, and analyses data after storing data into a DBMS. Here lies the necessity of data transfer from a mainframe to an open system and data conversion between different DBMS.

As known techniques of data conversion method between different DBMS there are discloses such as U.S. Pat. Nos. 6,016,501 and 6,035,307.

An EDM system (Enterprise Data Movement) system, cited in the above patent application Ser. No. 6,016,501 extracts data from the source DBMS to transform data format to that of targeted DBMS and feed the transformed data to the target DBMS. In general, data of the source DBMS and that of target DBMS are stored in a disk storage device, and the EDM system runs on a server. The data of source DBMS will be extracted to the server from the disk storage device through a SCSI channel, transformed to the data format specified by the target DBMS on the server, and loaded to the data field of the target DBMS through the SCSI channel.

Figure 11:
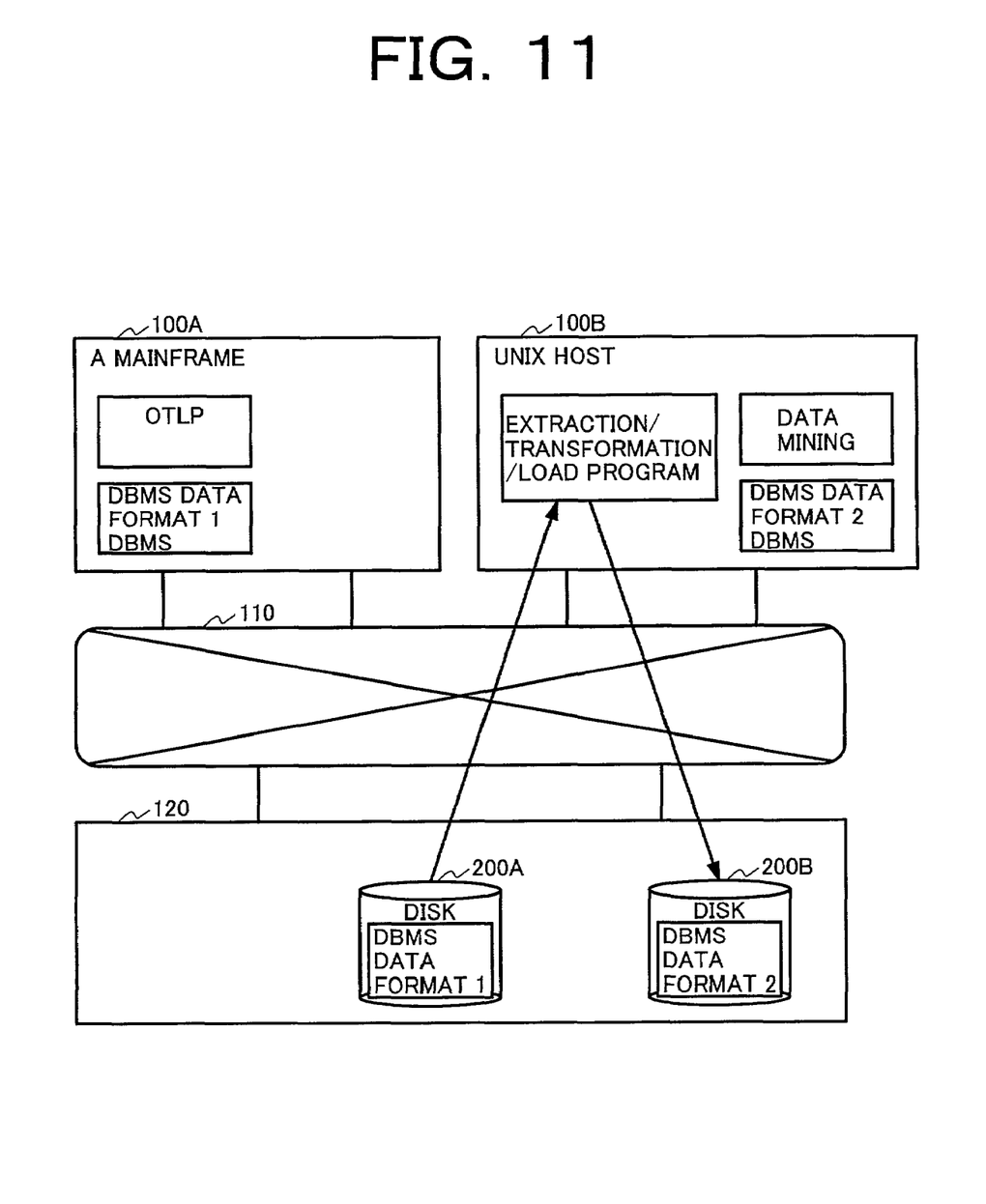
FIG. 11 is a schematic diagram of an exemplary data transformation in accordance with the Prior Art.

FIG. 11 shows schematically this method.

FIG. 11 shows a schematic diagram illustrating a data conversion method in accordance with the Prior Art.

In the data conversion as shown in FIG. 11, data in a DB 1 format, stored in a disk 200A of a disk storage device 120 will be loaded into a Unix host computer 100B, transformed to data in a DB 2 format by the data extraction/conversion/loading program to write into the disk 200B.

The data transfer between server and disk storage occurs twice here (once for reading out source data, and once for writing down the transformed data).

For the purpose of performing data mining, the amount of data transferred from the mainframe to the Unix host can easily reach to a few Tbytes (terabytes). This amount can be otherwise described a 10-hours course using a fibre channel of 100 Mbytes per second. The load to the entire system will be reached to an extreme.

There may be cases in which instead of one-step operation of the extraction/conversion/loading from the source DBMS data format to the target DBMS data format, the operation may be performed in three separated steps of extraction, conversion, and loading. In FIG. 11 of the aforementioned U.S. Pat. No. 6,035,307, an example of the Prior Art is cited, which perform database format conversion via a few intermediate-working formats.

A database format conversion using some intermediate file formats will be described here by referring to FIG. 12.

Figure 12:
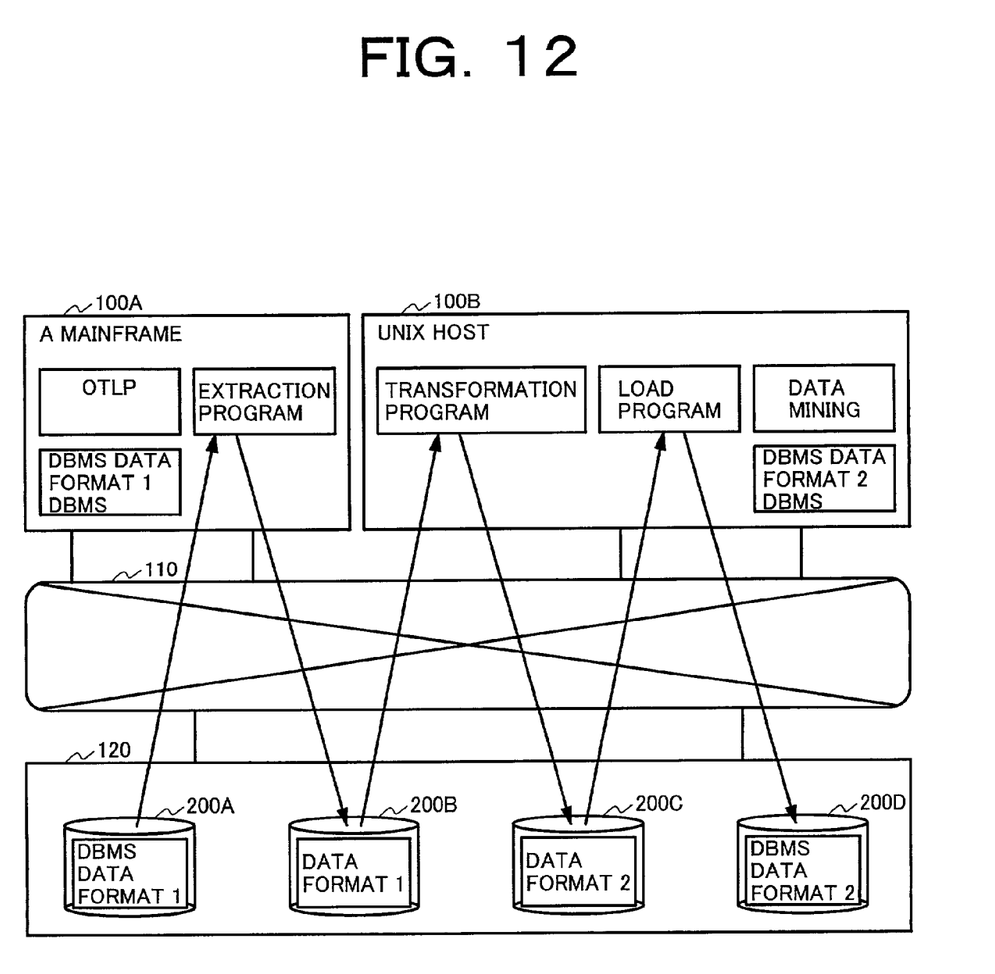
FIG. 12 is a schematic diagram of an exemplary data transformation in accordance with the Prior Art (using intermediate file formats).

FIG. 12 is a schematic diagram illustrating an exemplary data conversion in accordance with the Prior Art.

In a mainframe 100A, there is an extractor program, which transforms DB 1 format data in a disk 200A to the format 1 data on the disk 200B. On a Unix host 100B a transformer program and loader program are installed, the transformer program transforms the format 1 data on the disk 200B to the format 2 data on a disk 200C, while the loader program transforms the format 2 data on the disk 200D to the DB format 2 data on the disk 200D.

When transforming data of a database, if the intermediate data formats are used, the transformed intermediate data will also be written to the disk storage device. As a result the number of data transfer between the serve and disk storage will increase to 6 in this case, indicating the increase of data transfer time 6 times.

In the Prior Art as have been described above, data transformation is done on the host. This causes a problem that the data transformation will put some extreme load for the system. The larger the size of database is, the severer the problem becomes.

On the other hand, if the data transformation can be performed within a disk storage device, the data transfer between the server and the disk storage will be omitted.

SUMMARY OF THE INVENTION

The present invention has been made in view of the above circumstances and has an object to overcome the above problems and to provide a data transforming method of database management system, which may transform data within the disk storage device when transforming database data formats so as to reduce the system load.

Another object of the present invention is to provide a data transforming method of database management system, which may be easily developed by the program developer of the database management system and the program developer of the disk storage device.

In order to solve the problem cited above, the data trans forming method of database management system in accordance with the present invention launches a data transformation program within a disk storage device in response to a request received from a host. The request to the data transformation program on the disk storage device may be issued by a skeleton program running on the host. The application program that can normally issue a request to the data transformation program will issue a request to the skeleton program, which in turn will pass the request to the data transformation program on the disk storage device, on the behalf of the application. By setting the interface of the skeleton program to that of the data transformation program, the execution of data transformation program may be moved to the disk storage device, without the need of changing other programs.

On the disk storage device a communication program for the skeleton program and the data transformation program to communicate each other and an I/O (input/output) program for the data transformation program to read and write data on the disk storage device are to be installed.

In general, data transforming program developers (such as DBMS vendors) between different database management systems are quite often not the same as the program developers of the disk storage device. The program residing on a host can be developed, by the interface of communication programs and I/O programs provided by the program developers of disk storage device and by the use of such interface by the data transformation program developers.

DETAILED DESCRIPTION OF THE INVENTION

A detailed description of one preferred embodiment embodying the present invention will now be given referring to the accompanying drawings.

A preferred embodiment of the present invention will be described herein below by referring to FIG. 1 and FIG. 10.

[Network and hardware architecture for achieving the method for transforming data formats between database management systems in accordance with the present invention]

Now by referring to FIG. 1 and FIG. 2, a network and hardware architecture for achieving the method for transforming data formats between database management systems in accordance with the present invention will be described in greater details below.

Figure 1:
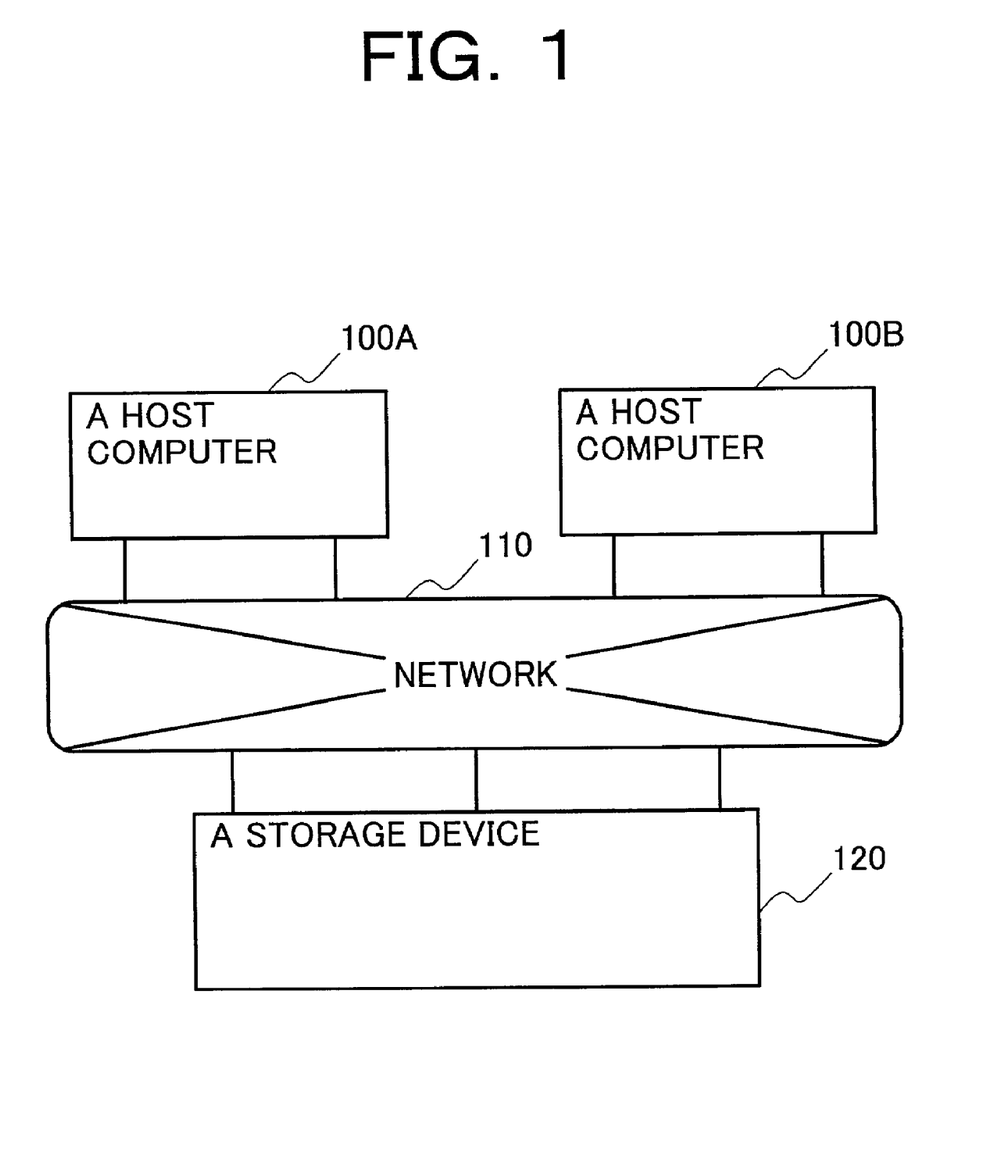
FIG. 1 is a schematic block diagram of network architecture for achieving a method for transforming data formats between database management systems in accordance with the present invention.

FIG. 1 is a schematic block diagram of network architecture for achieving a method for transforming data formats between database management systems in accordance with the present invention.

Figure 2:
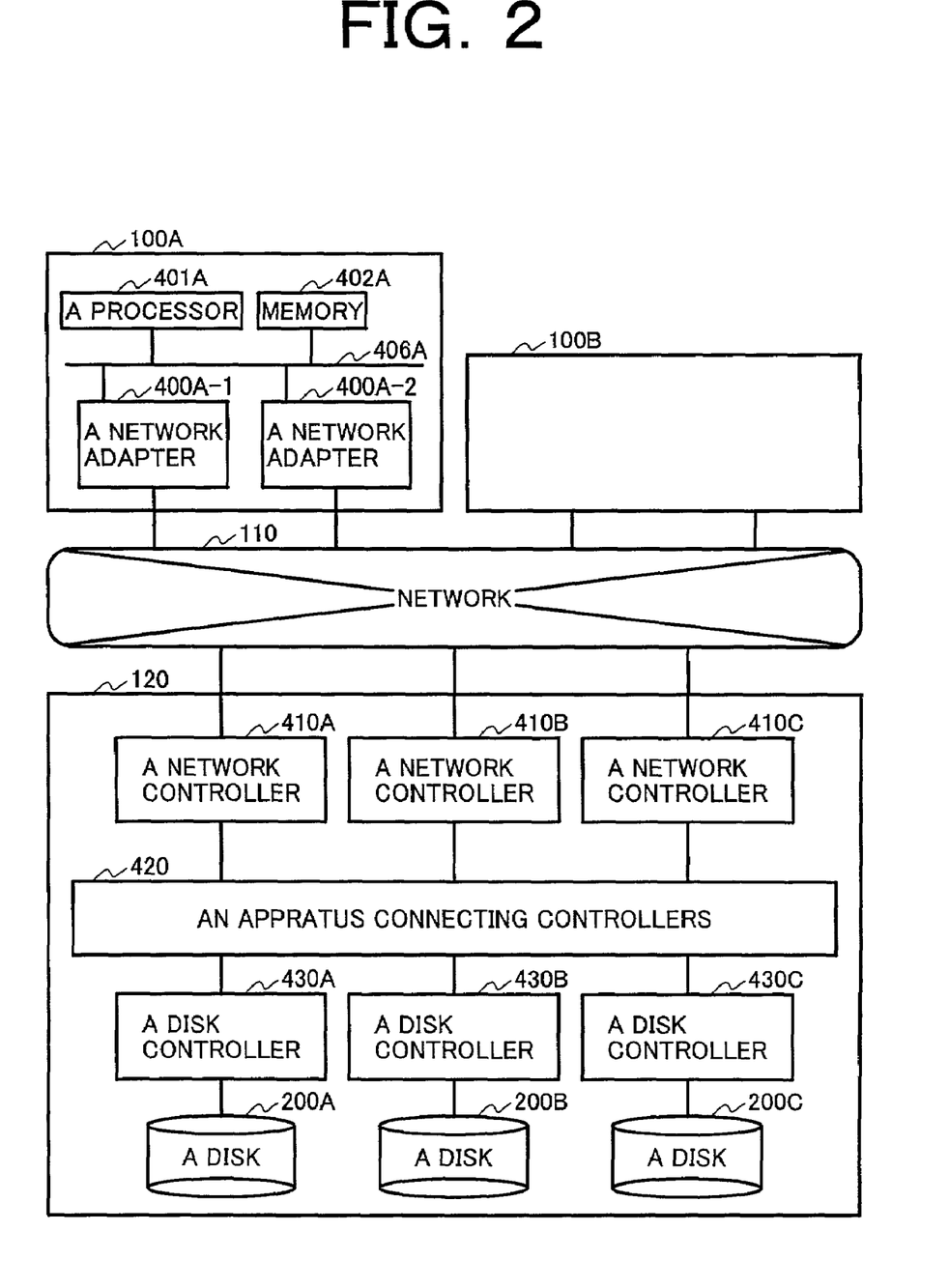
FIG. 2 is a schematic block diagram of hardware architecture for achieving a method for transforming data formats between database management systems in accordance with the present invention.

FIG. 2 is a schematic block diagram of hardware architecture for achieving a method for transforming data formats between database management systems in accordance with the present invention.

As shown in FIG. 1, the network architecture of database management system in accordance with the present invention includes computers 100 (100A, 100B), a network 110, and a disk storage device 120. The computers 100 and the disk storage device 120 are connected by the network 110.

The computers 100 will issue a request of data transformation to the disk storage device 120, which has a capacity enough to store entire data for a large-scale database. The disk storage device 120 suitable for use in the database management system in accordance with the present invention may have some degrees of intelligence to perform programs stored in the device in response to the instructions from the computers 100.

Components of this system will be described as follows, from the point of view of hardware architecture.

A computer 100A includes a processor 401A, a memory 402A, and host adapters 400A (400A-1, 400A-2). These components are connected via an internal bus 404A to send and receive commands and data.

The computer 100A is connected to the network 110 by the host adapters 400A.

The disk storage device 120 includes and host adapter controllers 410 (410A, 410B, 410C), a host-to-disk interface 420, disk adapters 430 (430A, 430B, 430C), and disks 200 (200A, 200B, 200C). The disk storage device 120 is connected to the network 110 by the host adapter controllers 410. The host adapter controllers 410 are connected to the disk adapters 430 inside the disk storage device 120. The disk adapters 430 is connected to a series of disks 200, which are so-called hard disk drives for storage a large amount of data using magnetic recording medium applied on an aluminium- or glass-based substrate.

The host-to-disk interface 420 may access to any of arbitrary disks by configuring the network, or may configured so as to have some predefined disks to which each of host adapter controllers 410 can access.

A read/write request from the computers 100 will be processed by the host adapter controllers 410, which will direct the read/write request to the disk adapters 430 which is connected to the desired disks 200 on which the requested data is stored.

[Software architecture of the method for transforming data formats between database management systems in accordance with the present invention and the operation thereof]

Figure 3:
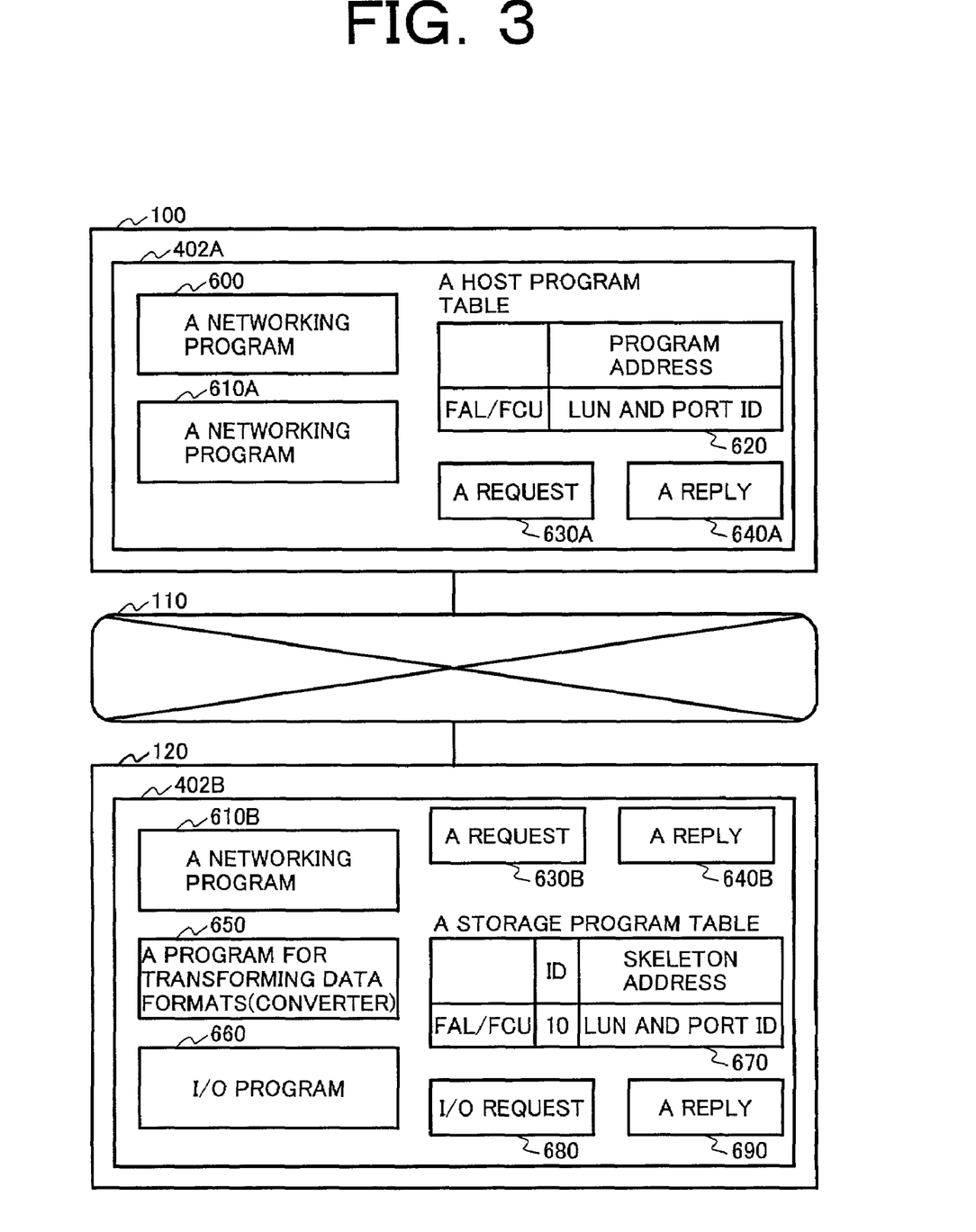
FIG. 3 is a schematic block diagram of software architecture for achieving a method for transforming data formats between database management systems in accordance with the present invention.
Figure 8:
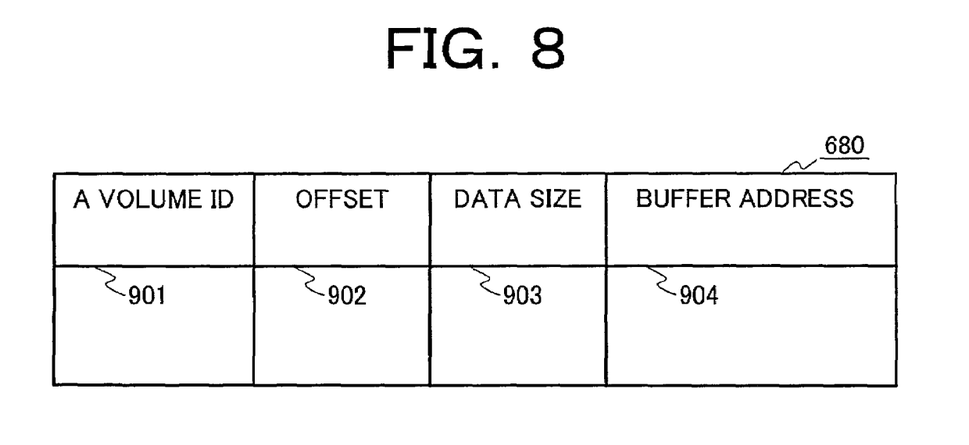
FIG. 8 is a schematic diagram of format of an I/O request 680.

Now referring to FIG. 3 and FIG. 8, the software architecture and the operation of the method for transforming data formats between database management systems in accordance with the present invention.

FIG. 3 is a schematic block diagram of software architecture for achieving a method for transforming data formats between database management systems in accordance with the present invention.

Figure 4:
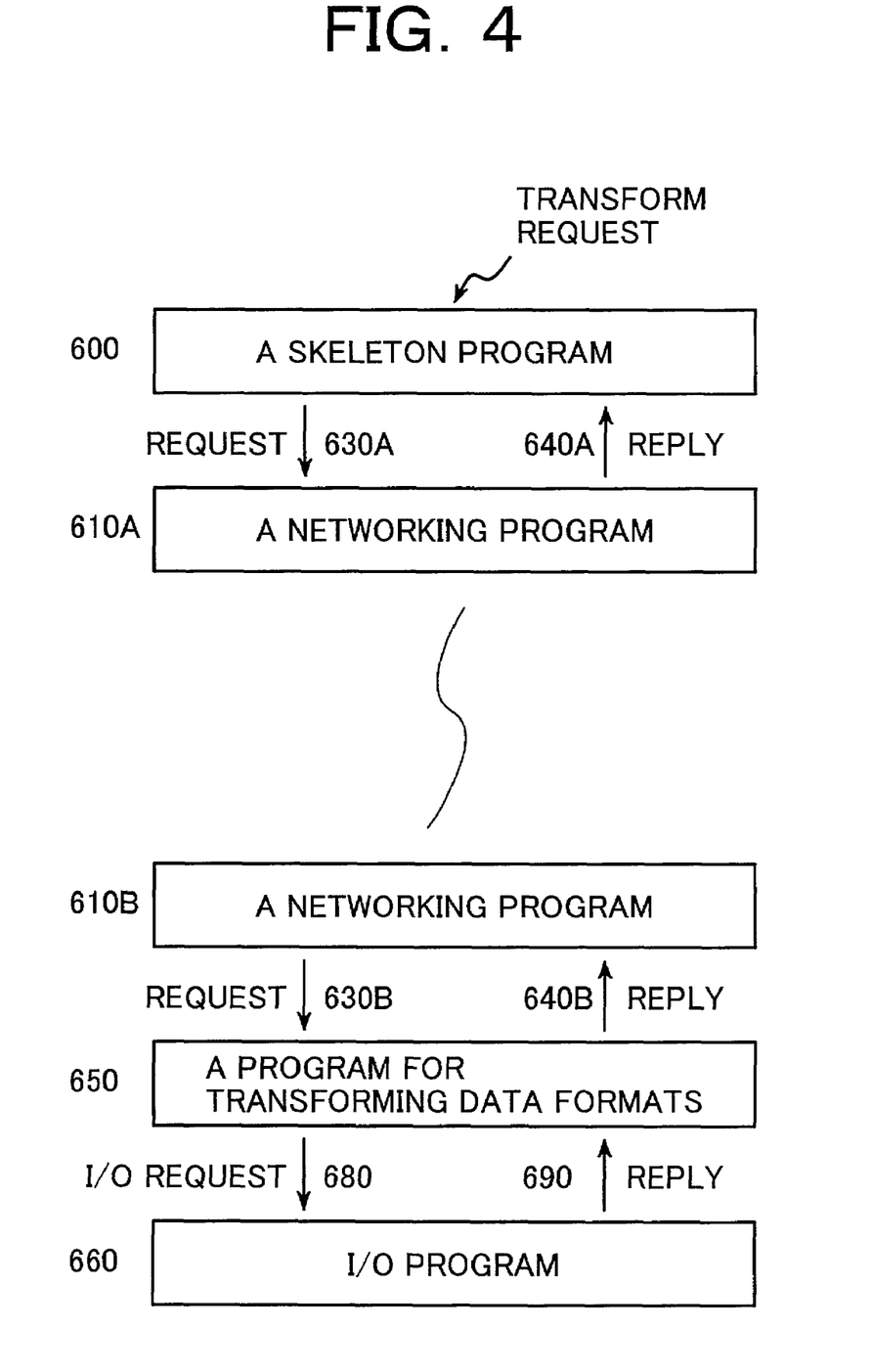
FIG. 4 is a schematic diagram of transmission of request and reply to a program that achieves a method for transforming data formats between database management systems in accordance with the present invention.

FIG. 4 is a schematic diagram of transmission of request and reply to a program that achieves a method for transforming data formats between database management systems in accordance with the present invention.

Figure 5:
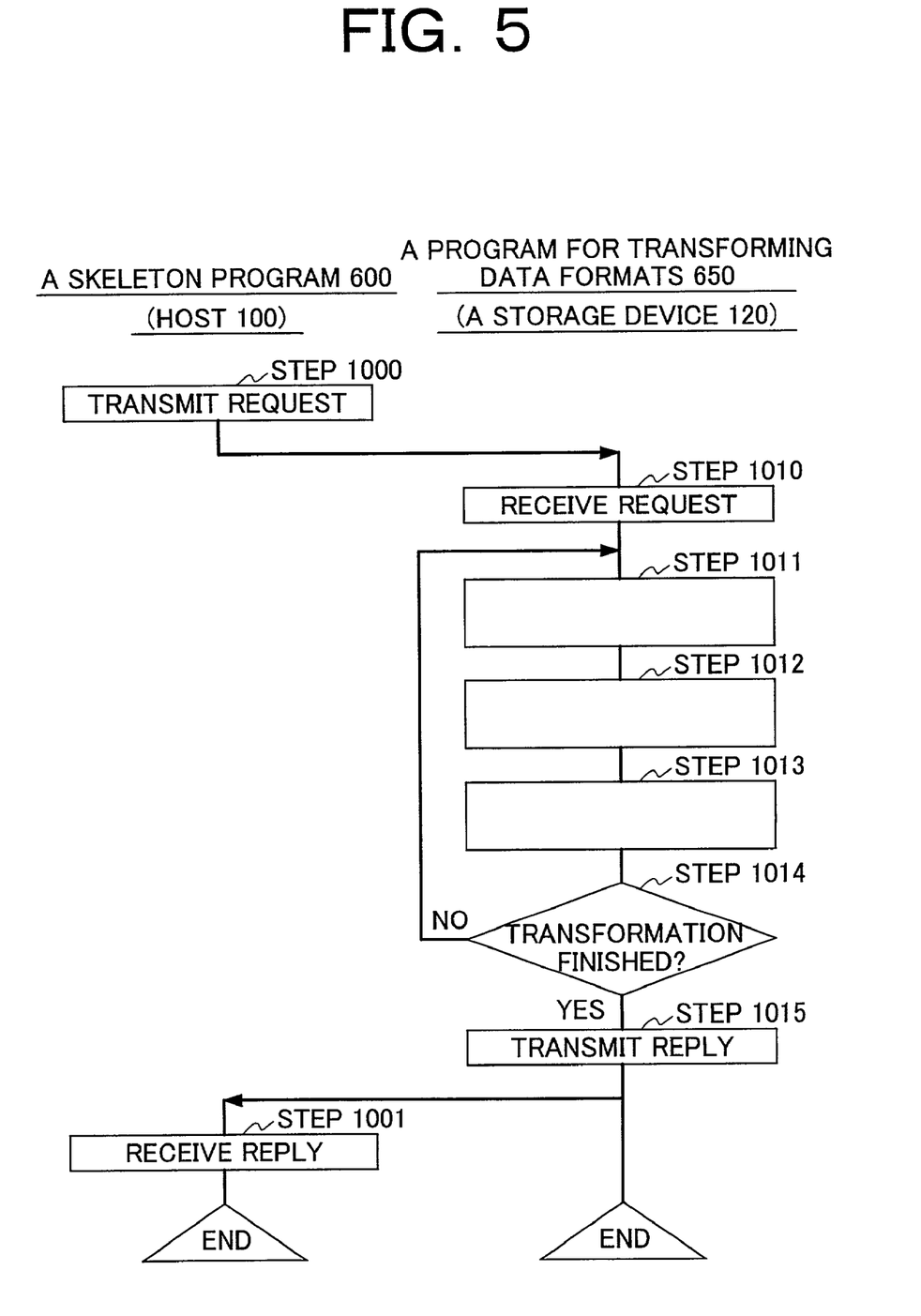
FIG. 5 is a flow chart illustrating the steps of a method for transforming data formats between database management systems in accordance with the present invention.

FIG. 5 is a flow chart illustrating the steps of a method for transforming data formats between database management systems in accordance with the present invention.

Figure 6:
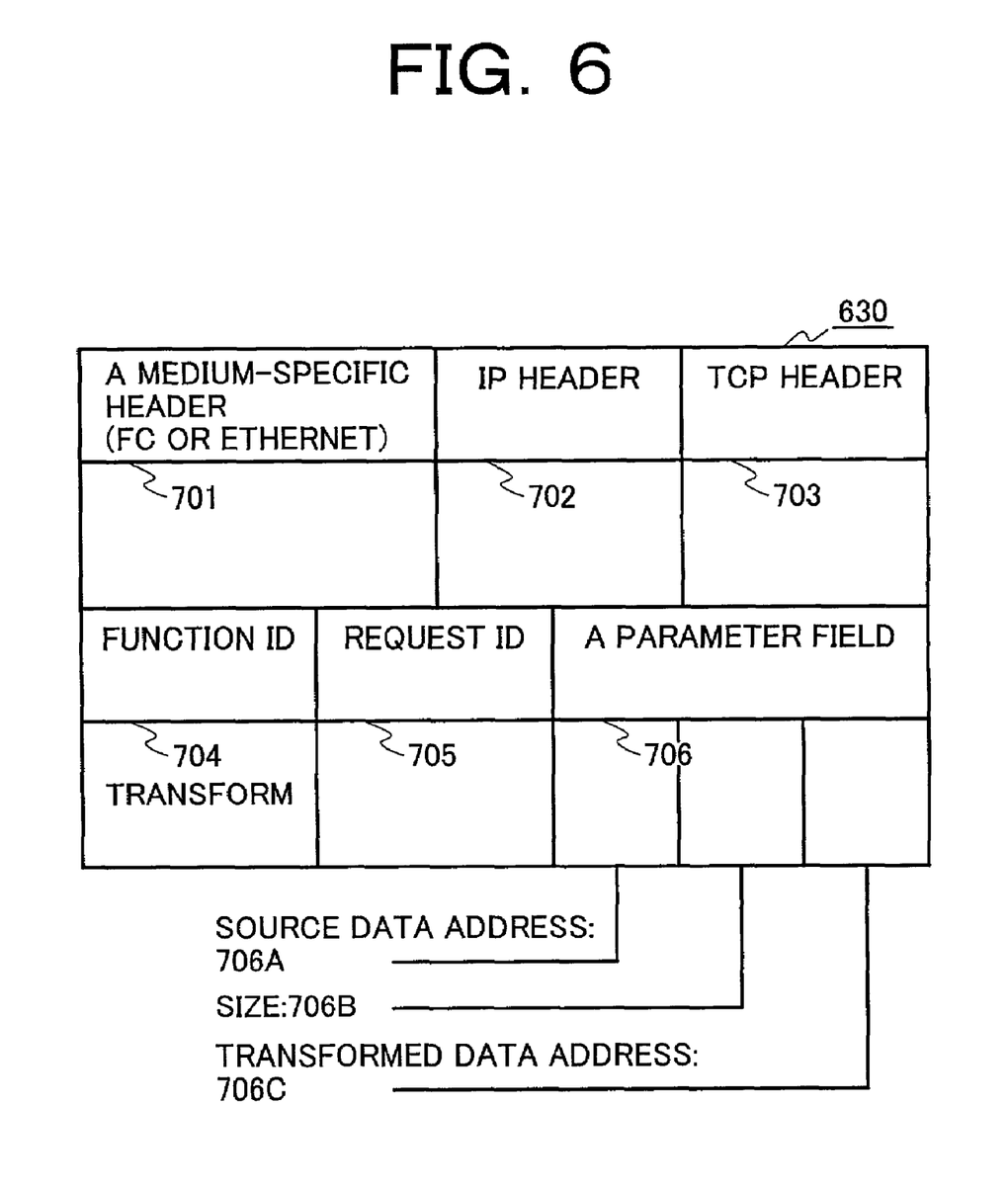
FIG. 6 is a schematic diagram of formats when a request 630 is achieved by packets of TCP/IP protocol.

FIG. 6 is a schematic diagram of formats when a request 630 is achieved by packets of TCP/IP protocol.

Figure 7:
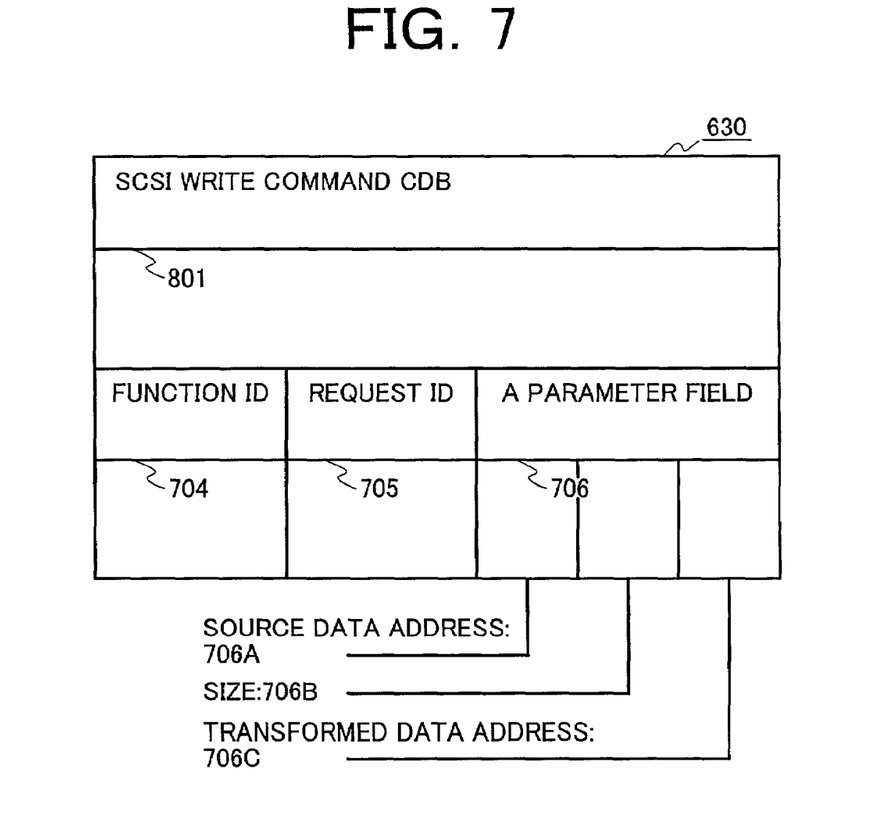
FIG. 7 is a schematic diagram of a format when the request 630 is achieved by SCSI commands.

FIG. 7 is a schematic diagram of a format when the request 630 is achieved by SCSI commands.

FIG. 8 is a schematic diagram of format of an I/O request 680.

As shown in FIG. 3, programs executed on the computers 100 are a skeleton program 600 and a communication program 610A. A host program table 620 is incorporated as a control table.

The skeleton program 600 is a program installed on a host in order to relay the data transformation requests from application programs to the disk storage device 120. The communication program 610A will perform interprocess communication between a communication program 610B on the disk device.

Programs executed on the disk storage device 120 are the communication program 610B, data transformer program 650, and I/O program 660.

The data transformer program 650 is a program for transforming data formats on the disk storage device 120, upon reception of commands from the skeleton program. The method for transforming data formats between different database systems in accordance with the present invention features data transformation on the disk storage device 120, which in general is performed on the computers 100.

The I/O program 660 is a program controlling I/O to and from the actual disk devices, and the data transformer program performs data transformation by commanding the I/O program.

A storage program table 670 is incorporated in the I/O program 660 as a control table. The symbol FAL in the drawings designates to the "File Access Library", FCL to the "File Conversion Utility".

The data transformation steps of the database management system in accordance with the present invention will be described in greater details by referring to FIG. 3 and FIG. 4, following the steps shown in the flow chart of FIG. 5.

A request of data transformation from a user application program is issued to the skeleton program 600.

The skeleton program 600 upon reception of data transformation request will retrieve the address information on the data transformer program 650 from the host program table 620. The skeleton program 600 will then use the communication program 610A to transmit the transformation request 630A to the data transformer program 650 (step 1000). As an example of address of data format transformer program, there is a combination of LUN (logical unit number) and port ID (port number) of a disk storage device, as shown in FIG. 3.

The communication program 610B on the disk storage will use the interprocess communication to send a transformation request 630B to the data transformer program 650.

The data transformer program 650, upon reception of the transformation request 630B (step 1010), will use the I/O program 660 to issue an I/O request 680 for reading out the source data to retrieve data as a reply 690 (step 1011).

The data transformer program 650 will then convert data to a predetermined format (step 1012) and write thus converted data to an address specified by the transformation request 630B, by issuing the I/O request 680 (step 1013). The data transformer program 650 will iteratively repeat this operation until no further data is present (step 1014). When there is no further data, the program will reply to the skeleton program the result of conversion process (step 1015).

Next, in the reverse order of request process, the data transformer program 650 will transmit a reply 640B to the communication program, which performs interprocess communication to deliver the reply 640B from the communication program 610A to the skeleton program 600 (step 1001).

At the time of interprocess communication, the address of the skeleton program 600 may be obtained from the storage program table 670.

The overview of the data structure of these requests and replies will be as follows.

When the computers 100 communicates with the disk storage device 120 to send and receive a request on TCP/IP packets, the request will be in the format shown in FIG. 6. The request format includes a medium-specific header 701, an IP header 702, a TCP header 703, a function ID 704, a request ID 705, and a parameter field 706.

Items arbitrarily set by the requesting user are the function ID 704, the request ID 705, and the parameter field 706.

The medium-specific header 701 contains information on the Ethernet, protocol of lower layer, and the like.

The IP header 702 contains information on IP protocol such as IP address. The TCP header 703 contains information on the port number.

The function ID 704 is an item for determining the function of request, and contains an identifier corresponding to "conversion" in case of data format conversion request.

The request ID 705 contains an identifier for determining uniquely a request.

The parameter field 706 of the request function is a field for storing parameters for this request. For example, as shown in FIG. 6, the source data address 706A, data size 706B, transformed data address 706C may be specified.

When the computers 100 and the disk storage device 120 send and receive a request using the Write command of the SCSI interface, the transmission will be in the format shown in FIG. 7.

When compared with the packet shown in FIG. 6, the difference is in the header. The header here is a SCSI Write command CDB (Command Description Block) 801. The items following are the same as those of FIG. 6.

The format of I/O request 680 to the I/O program 660 will be as shown in FIG. 8. An I/O request 680 contains a volume ID 901, an offset 902, a data size 903, and a memory address 904.

The volume ID 901 contains logical volume number of the disk. The offset is the offset of reading address of the device storing the data to be read out or the offset of writing address of the device to write data. The data size 903 is the size of data to be read out or written. The memory address is the destination memory address when transferring data read out of the device to the memory, or the offset address of the memory storing the data to be written into the device when writing to the storage device.

[An embodiment of the method for transforming data formats between different database systems in accordance with the present invention]

Figure 9:
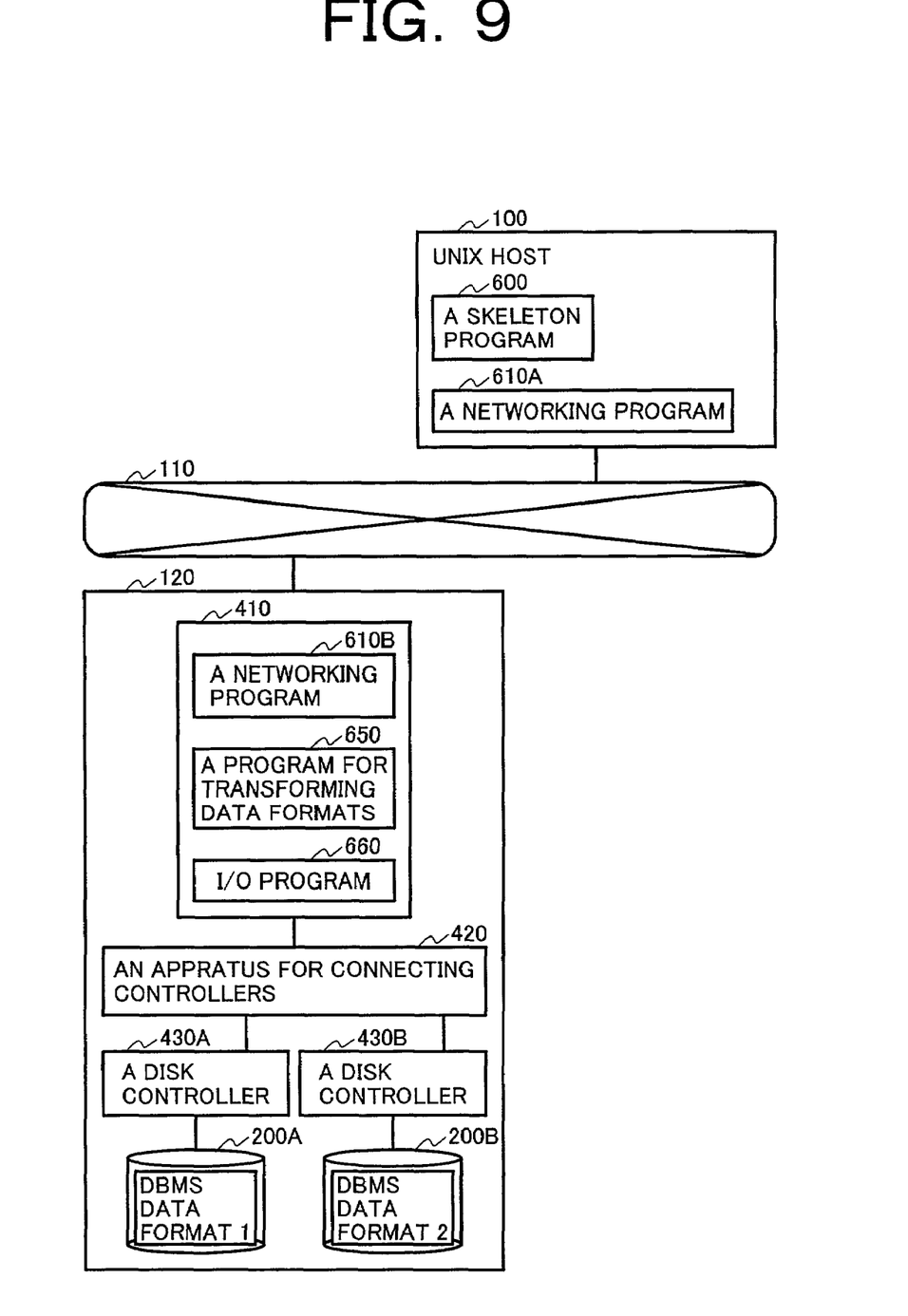
FIG. 9 is a schematic block diagram of hardware and software architecture for the data transformation corresponding to FIG. 11.
Figure 10:
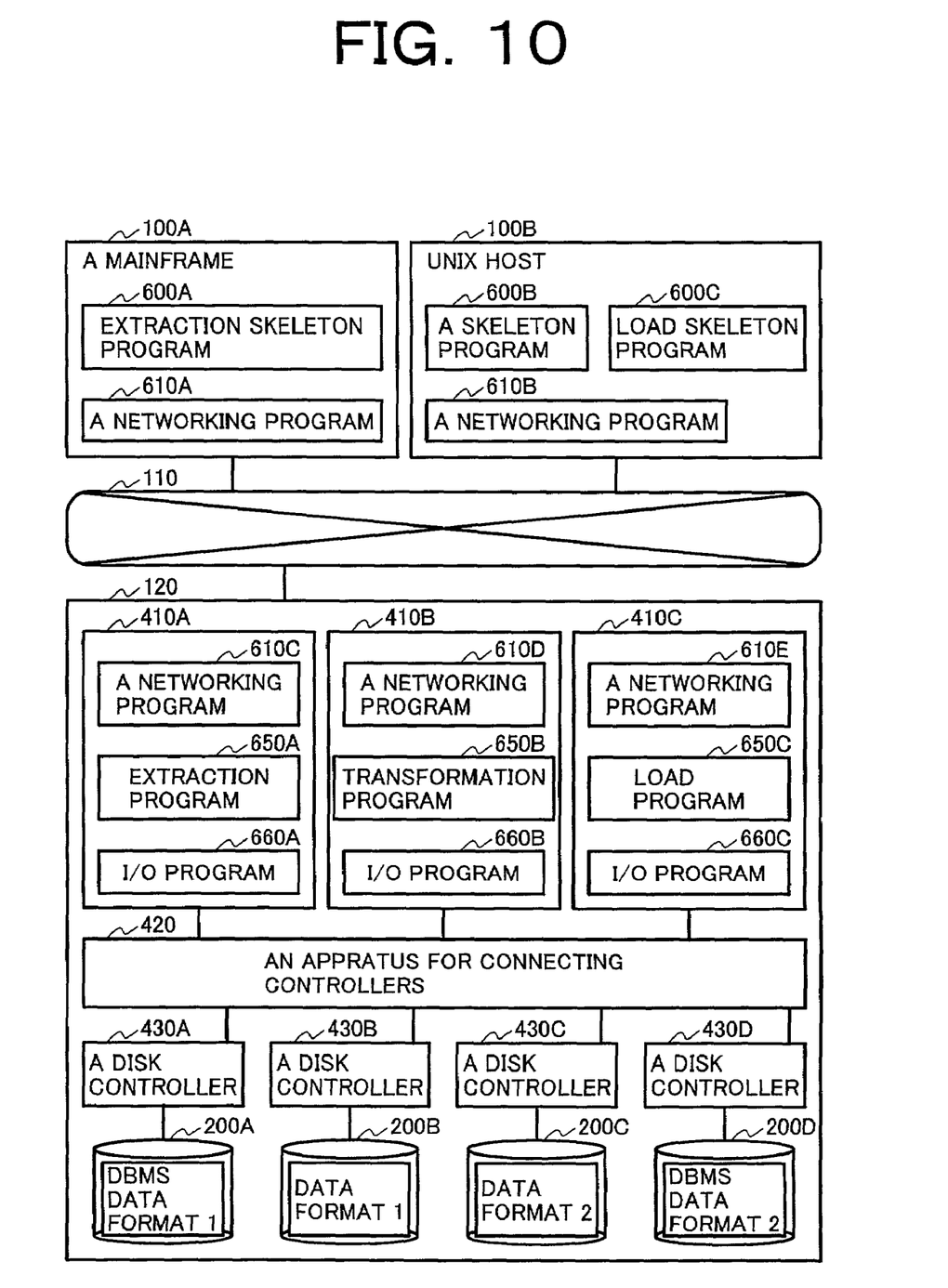
FIG. 10 is a schematic block diagram of hardware and software architecture for the data transformation corresponding to FIG. 12.

Now referring to FIG. 9 and FIG. 10, the method for transforming data formats between different databases systems will be further described by means of an embodiment by way of example.

FIG. 9 is a schematic block diagram of hardware and software architecture for the data transformation corresponding to FIG. 11.

FIG. 10 is a schematic block diagram of hardware and software architecture for the data transformation corresponding to FIG. 12.

The embodiment described with reference to FIG. 11 is a case of converting the data of DB format 1 on the disk 200A into the data of DB format 2 on the disk 200B, as have been described above.

The computers 100 are assumed to be Unix machines. On these Unix hosts the skeleton program 600 and the communication program 610A will be installed.

The host adapter controllers 410 of the disk storage device 120 will contain the communication program 610B, the data transformer program 650, and the I/O program 660.

The skeleton program will issue a request to the data transformer program 650 of the disk storage device 120 in response to the request from the application programs. The data conversion from the DB format 1 data to the DB format 2 data will be performed by the data transformer program 650.

The embodiment illustrated in FIG. 12 is a case using two intermediate data formats of format 1 data and format 2 data, in order to convert the DB format 1 data on the disk 200A to the DB format 2 data on the disk 200B.

In this example, the computers 100 are assumed to be comprised of a mainframe computer 100A and a Unix host computer The mainframe computer 100A will contain an extraction skeleton program 600A, and a communication program 610A. The Unix host computer 100B on the other hand will contain a transformation skeleton program 600B, and a communication program 610B.

Each of the disk adapter controllers 410A, 410B, 410C of the disk storage device 120 will contain an extraction program 650A, a transformation program 650B, and a load program 650C, respectively. The controllers will contain in addition a communication program and an I/O program.

when transforming the DB format 1 data of the disk 200A to the format 1 data of the disk 200B, the extraction skeleton program 600A receiving the request from an application program on the mainframe computer 100A, will issue a request to the extraction program 650A on the host adapter controller 410A.

In a similar manner, when transforming the format 1 data of the disk 200B to the format 2 data of the disk 200C, the transformation skeleton program 600B, which receives the request from an application program on the Unix host 100B will issue a request to the transformation program 650B on the host adapter controller 410B. Also, when transforming the format 2 data of the disk 200C to the DB format 2 data of the disk 200D, the loader skeleton program 600C, which receives the request from an application program on the Unix host 100B, will issue a request to the transformation program 650C on the disk adapter controller 410C.

In this case in particular, data transformation of the Prior Art needs three round trips of data transfer between the hosts and storage, while in accordance with the present invention, no data transfer between the hosts and disk storage is required. The effect of the present invention is estimated to be significant.

[Effect of the Present Invention]

As have been described above, in accordance with the present invention, when transforming data formats between database management systems, a data transforming method of database management system may be provided, which may transform data within the disk storage device when transforming database data formats so as to reduce the system load.

Also, a data transforming method of database management system, which may be easily developed by the program developer of the database management system and the program developer of the disk storage device may be provided.

What is claimed is:

1. A method for transforming data formats between different database management system programs including a host computer and a disk storage device for storing data, said method comprising the steps of:

providing, in said host computer, a database management system program, a computer program application which is executed on said database management system program, a skeleton program for instructing data format transformation and storing of a transformed data volume at a storage device connected to said host computer, information for said skeleton program to determine a data format transformation program in regard to a data volume in said disk storage device, said information being a table which sets forth corresponding relations between a plurality of data format transformation programs and addresses of said data format transformation programs in said disk storage device, and a first communication program for communication with said disk storage device;

providing, in said disk storage device, a plurality of data format transformation programs each for executing data format transformation and a second communication program for communication with said host computer;

obtaining, by said skeleton program, an address of a particular data format transformation program for performing data format transformation of a data volume to a transformed data volume from said table, said address of the particular data format transformation program including a Logical Unit Number (LUN) and Port Identifier (ID) indicating a particular data volume in the disk storage device where the particular data format transformation program is stored;

sending, from said skeleton program the disk storage device, a request to cause execution of the particular data format transformation program on said disk storage device via said first communication program at the time of data format transformation to instruct data format transformation and storing, by said disk storage device, the transformed data volume within said disk storage device;

receiving, by the particular data format transformation program, the request via said second communication program; and transforming, by the particular data format transformation program, the data volume having a data format of one database management system program on which said computer program application is executed into another data volume having the data format of another database management system program on which another computer program application is executed, said data format for said one database management system program being different from said data format of said another database management system program, wherein said request comprises:

the address for specifying the particular data format transformation program, an address of source data, a size of data to be transformed, and a destination address at which the transformed data volume is to be stored, wherein said host computer retrieves the transformed data volume from the destination address.

2. A method for transforming data formats between different database management system programs according to claim 1, wherein said disk storage device connects to another host computer.

3. A method for transforming data formats between different database management system programs according to claim 2, wherein said computer program application and said another database management system program are executed in said another host computer.

4. A method for transforming data formats between different database management system programs according to claim 3, wherein said host computer is a mainframe and said another host computer is a open system computer.

5. A method for transforming data formats between different database management system programs according to claim 1, wherein said request is transferred from said host computer to said disk storage device by using the Internet Protocol (IP).

6. A method for transforming data formats between different database management system programs according to claim 1, wherein said request is transferred from said host computer to said disk storage device by using Small Computer System Interface (SCSI) protocol.

7. A host computer according to claim 1, wherein said request is transferred from said host computer to said disk storage device by using Transfer Control Protocol (TCP/IP).

8. A host computer having a disk storage device attached for implementing a database management system, comprising:

a database management system program;

a computer program application which is executed on the database management system program;

a skeleton program for instructing a data format transformation and storing of a transformed data volume at the disk storage device attached to said host computer;

information for said skeleton program to determine a data format transformation program in regard to a data volume in said disk storage device, said information being a table which sets forth corresponding relations between a plurality of data format transformation programs and addresses of said data format transformation programs in said disk storage device, wherein said skeleton program obtains, an address of a particular data format transformation program for performing data format transformation of a data volume to a transformed data volume from said table, said address of the particular data format transformation program including a Logical Unit Number (LUN) and Port Identifier (ID) indicating a particular data volume in the disk storage device where the particular data format transformation program is stored; and a communication program for communication with said disk storage device, wherein said skeleton program sends a request to cause execution of the particular data format transformation program on said disk storage device via said communication program at the time of data format transformation to instruct data format transformation and storing, by said disk storage device, the transformed data volume within said disk storage device, wherein the particular data transformation program, performs a data format transformation of a data volume having the data format of said database management system program on which said computer program application is executed into another data volume having the data format of another database management system program, said data format of said database management system program being different from said data format of said another database management system program and to store data volume having said another data format within said disk storage device;

wherein said request comprises:

the address for specifying the particular data format transformation program, an address of source data, a size of data to be transformed, and a destination address at which the transformed data volume is to be stored, and wherein said host computer retrieves the transformed data volume from the destination address.

9. A host computer according to claim 8, wherein said request is transferred from said host computer to said disk storage device by using Transfer Control Protocol (TCP/IP).

10. A host computer according to claim 8, wherein said request is transferred from said host computer to said disk storage device by using Small Computer System Interface (SCSI) protocol.

11. A method for transforming data formats between different database management system programs according to claim 8, wherein said request is transferred from said host computer to said disk storage device by using the Internet Protocol (IP).

12. A disk storage device attached to a host computer for storing data of a database management system, comprising:

a plurality of data format transformation programs each for performing, within said disk storage device, a data format transformation, wherein, upon receipt of a request from a skeleton program provided in the host computer instructing data format transformation by a particular data format transformation program, data format transformation is conducted by the particular data format transformation program of a data volume having a data format of the database management system program, on which a computer program application is executed into another data volume having the data format of another database management system program, said data format for said database management system program being different from said data format of said another database management system program, wherein said skeleton program determines the particular data format transformation program based on information including a table which sets forth corresponding relations between a plurality of data format transformation programs and addresses of said data format transformation programs in said disk storage device;

wherein said skeleton program obtains the address of the particular data format transformation program for performing data format transformation of a data volume to a transformed data volume from said table, said address of the particular data format transformation program including a Logical Unit Number (LUN) and Port Identifier (ID) indicating a particular data volume in the disk storage device where the particular data format transformation program is stored;

a communication program for communication with said host computer, wherein said skeleton program sends a request to cause execution of the particular data format transformation program on said disk storage device via said communication program at the time of data format transformation to instruct data format transformation and to cause storage of the transformed data volume within said disk storage device, wherein said request comprises:

the address for specifying the particular data format transformation program, an address of source data, a size of data to be transformed, and a destination address at which the transformed data volume is to be stored, and wherein said host computer retrieves the transformed data volume from the destination address.

13. A host computer according to claim 12, wherein said request is transferred from said host computer to said disk storage device by using Transfer Control Protocol (TCP/IP).

14. A host computer according to claim 12, wherein said request is transferred from said host computer to said disk storage device by using Small Computer System Interface (SCSI) protocol.

15. A method for transforming data formats between different database management system programs according to claim 12, wherein said request is transferred from said host computer to said disk storage device by using the Internet Protocol (IP).

* * * * *